Feb. 11, 1947.  R. B. NORTON  2,415,652

HIGH VOLTAGE CABLE

Filed June 3, 1942

INVENTOR
RALPH B. NORTON
BY
Byerly, Watson + Simonds
ATTORNEYS

Patented Feb. 11, 1947

2,415,652

UNITED STATES PATENT OFFICE 2,415,652

HIGH-VOLTAGE CABLE

Ralph B. Norton, Seymour, Conn., assignor to The Kerite Company, Seymour, Conn., a corporation of Connecticut Application June 3, 1942, Serial No. 445,631

5 Claims. (Cl. 174—107)

This invention relates to high-voltage cables and aims permanently to eliminate the dangers heretofore involved in the use of such cables.

It has long been recognized that the use of a high-voltage cable involves considerable danger unless the outer surface of the insulation of the cable is effectively grounded. Such grounding is required for two purposes. One is to draw off continuously the so-called charging current to prevent the building up of a dangerously high voltage on the outer surface of the cable through condenser action. The other is to draw off fault currents which pass through the cable insulation in the case of a failure of the insulation at some point along the cable. It is very important that fault currents be effectively grounded as soon as any fault in the insulation occurs in order that the flow of current may immediately be sufficient to operate the usual circuit breaker or other safety device provided for disconnecting any cable whose insulation may fail. Delay in operation of the circuit breaker caused by the absence of an effective grounding path for a fault current may result in the destruction of a considerable part of the cable, and also other parts of the installation.

The requirements for drawing off charging current and for drawing off a fault current are very different as the former requires a path of only moderate conductivity owing to the small amperage of the charging current while the latter requires a path of high conductivity in order that the initial fault current may have sufficient amperage to operate the circuit breaker.

Metal grounding means for cable insulation such as a copper band wound about the insulation or a lead sheath enclosing the insulation are effective for both purposes so long as the metal remains in its initial condition; but such metal sheaths and bands are subject to corrosion and are not infrequently completely broken and destroyed by corrosion when applied to cables used in ducts and other places where they are subject to moisture and other conditions leading to corrosion. The usual metal grounding means are thus unsatisfactory since their effective operation is limited to a comparatively short period, the length of which cannot be determined in advance. Such means, therefore, do not make high-voltage cables permanently safe.

In accordance with my invention, cable insulation is provided with a grounding means consisting of a metal conductor enclosed in a thin moisture-proof casing of vulcanized rubber or rubber substitute which permanently protects the metal from corrosion. By incorporation of approximately 50% of carbon particles in the rubber, the casing is rendered semi-conductive without reducing its moisture-proof qualities. The casing of the grounding conductor is placed in contact with the outer surface of the cable insulation.

The new grounding means is effective in drawing off charging current since the conductivity of the casing is sufficient to permit the charging current to pass radially through the thin casing from the cable insulation to the encased metal conductor through which it is easily conducted to ground.

My new grounding means is effective in grounding fault currents as soon as any small fault in the cable insulation occurs, as the initial current immediately passes through the semiconducting casing of the grounding conductor in such amperage that it quickly destroys the casing and finds a highly conductive path to ground through the metal conductor. As a result the circuit breaker or other safety device is operated instantly when any fault in the cable insulation occurs.

In order that my invention may be fully understood, I will describe in detail illustrative embodiments of it which are shown in the accompanying drawing in which.

Figure 2:
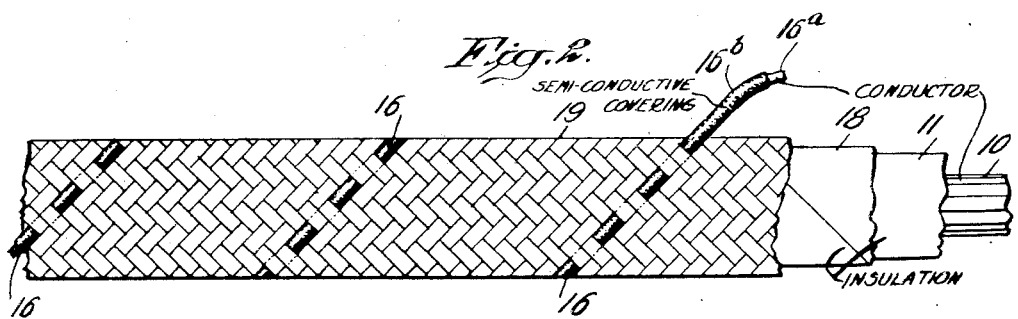
Fig. 2 is a broken-away side view of the cable embodying my invention.

Fig. 2 shows a high-voltage cable having a copper conductor 10, a rubber or rubber substitute insulation 11, a thin layer of rubber-filled tape 18 wrapped over the insulation to give it mechanical strength, and the braided outer jacket 19. The outer jacket 19 may be made of any suitable material, as for instance asbestos yarn treated with any suitable finishing compound.

The cable is provided with a grounding conductor 16 which includes a copper core or wire 16a and a vulcanized covering 16b. The covering 16b is moisture-proof and need be only of sufficient thickness to protect the metal core 16a from moisture or liquids. The covering consists of vulcanized rubber, or a rubber substitute such as "neoprene," incorporating sufficient non-corrosive conducting material, such as graphite, to make it slightly conductive. A conductivity of .0001 mhos per cubic inch is sufficient, and this may be obtained by incorporating approximately 50% of graphite in the rubber or rubber substitute.

The grounding conductor 16 is placed with its casing in contact with the effective outer surface of the insulation, which in the cable shown in Fig. 2 is the outer surface of the rubber-filled tape 18 forming the protective outer layer of the insulation. This may be done as shown in Fig. 2 by weaving the conductor 16 into the braided jacket 19 to replace one of the strands of the jacket. It will be seen from Fig. 2 that this brings the casing 16a into frequent contact with the tape 18. Such contact occurs in the areas where the conductor 16 is indicated by dotted lines in Fig. 2.

Figure 3:
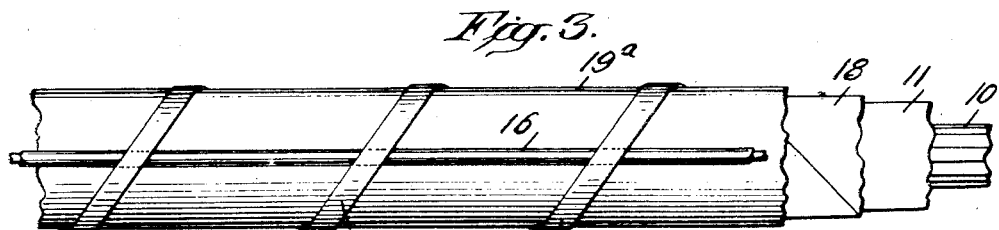
Figs. 3 and 4 are similar views of modified constructions.

In an alternative construction shown in Fig. 3, the grounding conductor 16 extends parallel to the cable and is held in contact with the outer surface of the cable, which in this case may be regarded as the effective outer surface of the cable insulation, by a spirally wound tape 20.

Figure 4:
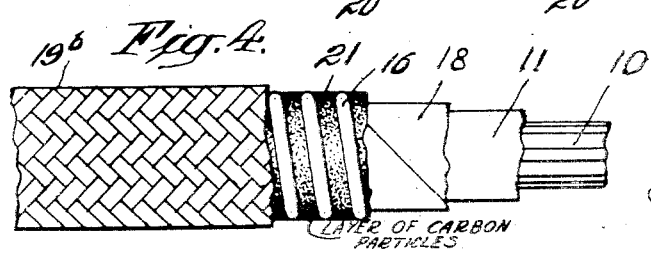

Effective conduction of the charging current along the outer surface of the cable to the points where the grounding conductor 16 is in contact with the outer surface is provided in the cable shown in Fig. 2 by the slight conductivity of the asbestos braid. Only slight conductivity at the surface of the insulation is required as all points on the outside of the insulation are only short distances from some point where the insulation is in contact with the grounding conductor 16. It is, therefore, not always necessary to provide any special means for conducting the charging current along the cable insulation to these points, but in some cases it may be desirable to give the insulation a semi-conducting outer surface in any usual manner such as covering it with a non-corrosive conducting paint or incorporating some graphite in the tape 18 forming the outer finish of the insulation. For greatest safety, a conducting layer 21 of carbon particles made from a carbon paste may be included between the insulation 11, 18 and the outer jacket 19b, and the grounding conductor 16 may be embedded in this layer as shown in Fig. 4.

The operation of the grounding wire in drawing off charging current is obvious from the above description. Its other important function in securing prompt operation of a circuit breaker in the case of any fault in the cable insulation will be explained in connection with Fig. 1.

Figure 1:
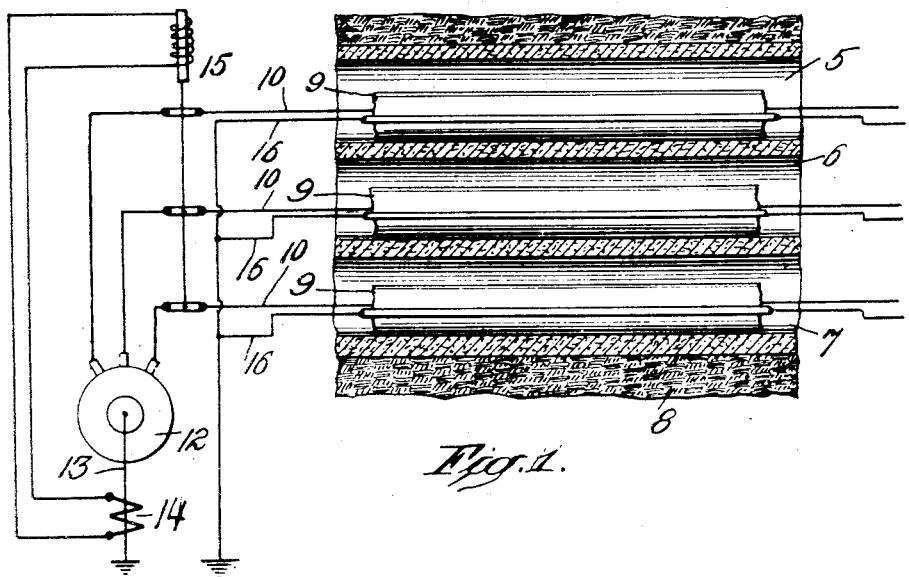
Fig. 1 is a vertical section of an underground duct line showing three cables embodying my invention and their electrical connections.

In the installation shown in Fig. 1, three cables 9 in ducts 5, 6 and 7 laid in the ground 8 have their conductors 10 connected to a generator 12 through a circuit breaker 15 operable by current from a current transformer 14 in a ground connection 13 from the neutral of the generator. As is well understood, a flow of current from the conductor of one of the cables to ground will operate the circuit breaker in such an installation. If a small fault occurs in the insulation of any one of cables in the duct, the current passing through the insulation will immediately flow through the covering of the grounding conductor 16 associated with this cable and start a flow of current from the cable conductor 10 to ground, which immediately increases in amperage sufficiently to destroy the covering 16a of the grounding conductor at the fault point allowing a large amperage flow which instantly throws the circuit breaker and disconnects the cable containing the fault before any further damage occurs.

What I claim is:

1. The combination with a high-voltage cable including a conductor and insulation surrounding the conductor, of a grounding conductor consisting of a metal core and a thin, annular, moisture-proof conducting covering coaxial with its metal core and consisting of vulcanized rubber-like material incorporating non-corrosive conductive particles, the grounding conductor extending along and fixed to the cable adjacent its outer surface with the outer surface of its covering in contact with the effective outer surface of the cable insulation.

2. The combination claimed in claim 1 with the addition of a braided jacket surrounding the cable insulation, the grounding conductor extending spirally along the cable as a strand of the braided jacket.

3. The combination claimed in claim 1 with the addition of non-corrosive conductive particles at the effective outer surface of the insulation to render said surface semi-conductive, the grounding conductor having its covering in contact with the conductive outer surface of the insulation.

4. The combination claimed in claim 1 with the addition of a layer of carbon particles surrounding the effective outer surface of the cable insulation and a non-metallic outer jacket covering this layer, the grounding conductor extending along the cable between the insulation and the outer jacket and being embedded in the layer of carbon particles.

5. The combination with a high-voltage cable including a conductor and insulation surrounding the conductor, of a grounding conductor consisting of a metal core and a thin, annular covering coaxial with its metal core and consisting of vulcanized rubber-like substance incorporating approximately 50% of graphite, the grounding conductor extending along and fixed to the cable adjacent its outer surface with the outer surface of its covering in contact with the effective outer surface of the cable insulation.

RALPH B. NORTON.

REFERENCES CITED

The following references are of record in the file of this patent:

UNITED STATES PATENTS

| Number | Name | Date |
| --- | --- | --- |
| 2,165,738 | Van Hoffen | July 11, 1939 |
| 1,956,639 | Dana et al. | May 1, 1934 |
| 2,074,826 | Boggs | Mar. 23, 1937 |
| 1,938,308 | Wiegand | Dec. 5, 1933 |

FOREIGN PATENTS

| Number | Country | Date |
| --- | --- | --- |
| 526,895 | British | Sept. 27, 1940 |
| 539,109 | British | Aug. 28, 1941 |